United States Patent
Potakamuri

(10) Patent No.: US 8,756,338 B1
(45) Date of Patent: Jun. 17, 2014

(54) STORAGE SERVER WITH EMBEDDED COMMUNICATION AGENT

(75) Inventor: Sreenivasa Potakamuri, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 572 days.

(21) Appl. No.: 12/770,501

(22) Filed: Apr. 29, 2010

(51) Int. Cl.
*G06F 15/173* (2006.01)

(52) U.S. Cl.
USPC ............ 709/238; 711/154; 709/217; 709/202

(58) Field of Classification Search
None
See application file for complete search history.

(56) References Cited

U.S. PATENT DOCUMENTS

| | | | |
|---|---|---|---|
| 7,725,473 B2 * | 5/2010 | Lamb et al. | 707/758 |
| 7,913,300 B1 * | 3/2011 | Flank et al. | 726/12 |
| 7,970,907 B2 * | 6/2011 | Groves et al. | 709/226 |
| 7,984,253 B1 * | 7/2011 | Glade et al. | 711/154 |
| 8,190,816 B2 * | 5/2012 | Balasubramanian et al. | 711/114 |
| 2005/0114595 A1 * | 5/2005 | Karr et al. | 711/114 |
| 2006/0041580 A1 * | 2/2006 | Ozdemir et al. | 707/102 |
| 2007/0299951 A1 * | 12/2007 | Krithivas | 709/223 |
| 2008/0098321 A1 * | 4/2008 | Krithivas | 715/771 |
| 2008/0155169 A1 * | 6/2008 | Hiltgen et al. | 711/6 |
| 2008/0155223 A1 * | 6/2008 | Hiltgen et al. | 711/173 |
| 2010/0198972 A1 * | 8/2010 | Umbehocker | 709/226 |
| 2010/0199276 A1 * | 8/2010 | Umbehocker | 718/1 |

\* cited by examiner

*Primary Examiner* — Greg C Bengzon

(74) *Attorney, Agent, or Firm* — DeLizio Gilliam, PLLC

(57) ABSTRACT

A storage server receives a data access request in a standard communication format, such as the Storage Management Initiative-Specification (SMI-S). A single mode request is received at a disk module of the storage server and a cluster mode request is received at a management host of the storage server. The request is forwarded to a communication agent in a management module of the storage server. The communication agent translates the request from the standard communication format to a proprietary format used by the storage server to communicate with an attached storage subsystem. The storage server services the request from the attached storage subsystem through a disk module. In cluster mode, the request is forwarded to corresponding disk modules in each storage server in the cluster.

21 Claims, 9 Drawing Sheets

STORAGE SERVER WITH EMBEDDED COMMUNICATION AGENT

TECHNICAL FIELD

This invention relates to the field of data storage systems and, in particular, to a storage server having an embedded communication agent.

BACKGROUND

Various forms of network storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network storage system can include at least one storage system, which is a processing system configured to store and retrieve data on behalf of one or more storage client processing systems ("clients"). In the context of NAS, a storage system may be a file server, which is sometimes called a "filer." A filer operates on behalf of one or more clients to store and manage shared files in a set of mass storage devices, such as magnetic or optical disks or tapes, or flash drives. The mass storage devices may be organized into one or more volumes of a Redundant Array of Inexpensive Disks (RAID). In a SAN context, the storage server provides clients with block-level access to stored data, rather than file-level access. Some storage servers are capable of providing clients with both file-level access and block-level access.

In a typical storage system, client devices and storage servers from different manufacturers may be used together. To enable effective communication between the different devices, a storage communication standard may be used. One example is the Storage Management Initiative-Specification (SMI-S) maintained by the Storage Networking Industry Association (SNIA). A communication agent (i.e., SMI-S agent) is used to translate standard SMI-S commands into a proprietary format used by the storage server. In conventional systems, the communication agent runs outside the storage server on a host computing device running an operating system such as Windows™ or Linux. This host machine requires additional hardware increasing the cost of the system. In addition, being outside the storage server limits the scalability of the agent and limits the number of nodes in the storage system that it can support. As the communication agent on the host machine communicates with one or more nodes in the storage system, a latency may develop in communications between the different devices. The latency may be increased especially if the host machine and storage servers are in different subnets. In addition, if the storage system includes storage devices from a number of different vendors, there may need to be a different communication agent for each storage vendor. Running multiple communication agents on a single host machine may cause conflicts and result in decreased performance. Having a separate host machine for each communication agent can lead to increased costs.

SUMMARY OF THE INVENTION

A storage server receives a data access request in a standard communication format, such as the Storage Management Initiative-Specification (SMI-S). A single mode request is received at a disk module of the storage server and a cluster mode request is received at a management host of the storage server. The request is forwarded to a communication agent in a management module of the storage server. The communication agent translates the request from the standard communication format to a proprietary format used by the storage server to communicate with an attached storage subsystem. The storage server services the request from the attached storage subsystem through a disk module. In cluster mode, the request is forwarded to corresponding disk modules in each storage server in the cluster.

BRIEF DESCRIPTION OF THE DRAWINGS

The present invention is illustrated by way of example, and not by way of limitation, in the figures of the accompanying drawings.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Embodiments are described for a communication agent embedded in a storage server. In one embodiment, the communication agent may be a Storage Management Initiative-Specification (SMI-S) agent configured to use data in the SMI-S format. The SMI-S agent translates a received data access request from the SMI-S format to a proprietary format used by the storage server to communicate with an attached storage subsystem. An internal architecture of the storage server enables a single SMI-S agent to handle data access requests in both a single mode and a cluster mode.

For a single mode data access request, the request is received at a logical interface in a disk module (D-module) of the storage server. The disk module forwards the single mode request to the SMI-S agent which resides in a management module (M-host) of the storage server. The SMI-S agent translates the request and selects and calls the corresponding application programming interfaces (APIs) so that the request may be serviced from the attached storage subsystem through the D-module.

Figure 1A:
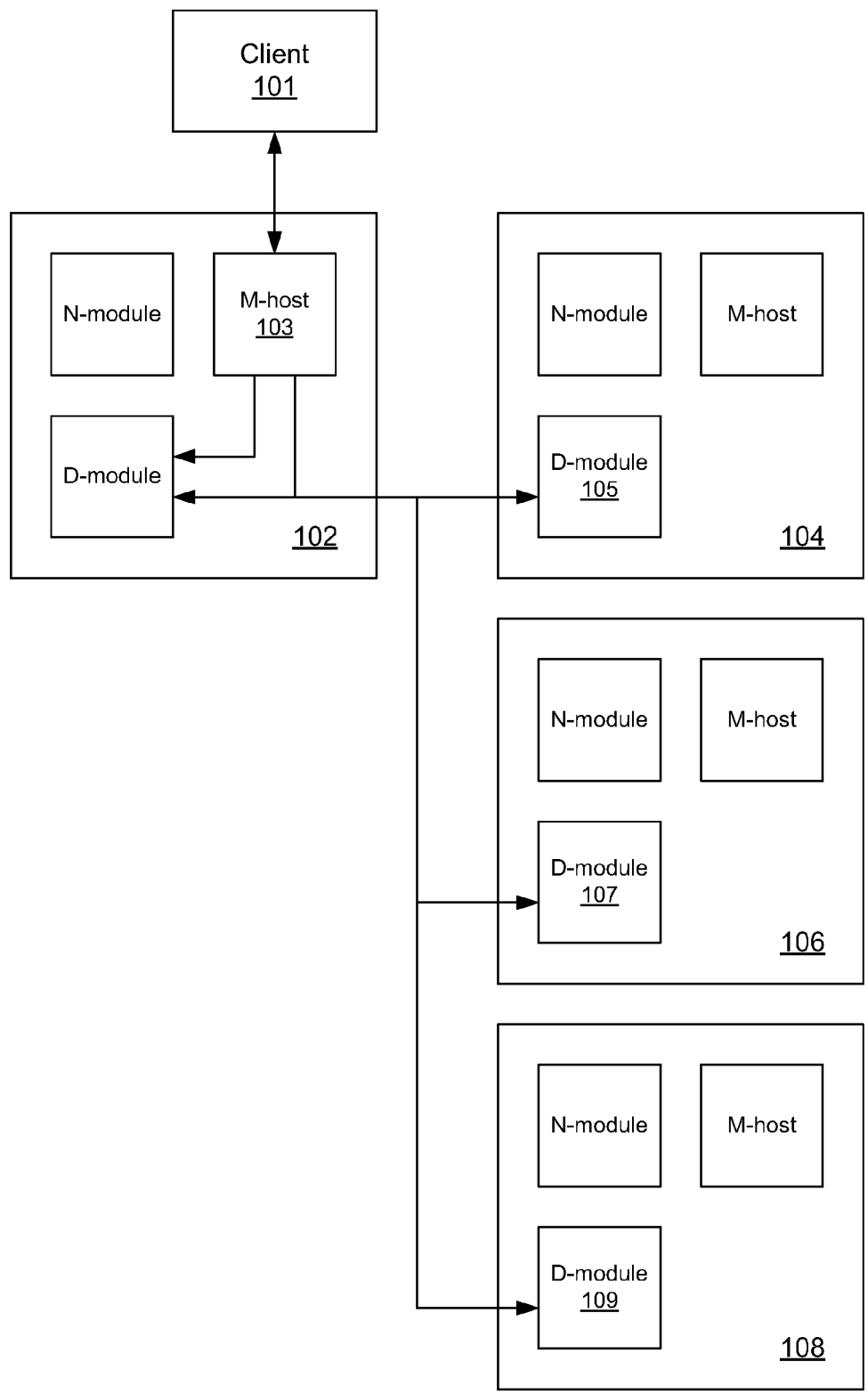
FIG. 1A is a block diagram illustrating a clustered storage system according to an embodiment.

For a cluster mode request, the request from client 101 is received directly at a logical interface of a management module, such as M-host 103, of storage server 102, as shown in FIG. 1A. The request is processed by M-host 103 as discussed below with respect to FIG. 1B. A communication agent, such as an SMI-S agent, (not shown) in M-host 103 performs the translation and calls a different set of APIs. In the cluster mode, the storage server 102 is arranged in a clustered configuration with one or more other storage servers 104, 106 and 108, which together make up a storage cluster. The cluster mode request is forwarded by the M-host 103 of storage server 102 to a disk module, such as D-modules 105, 107 and 109, in each storage server 104, 106 and 108 so that the request may be executed on a storage subsystem attached to each storage server in the cluster. Each of storage servers 102, 104, 106 and 108 may have attached mass storage devices, which the D-module in each storage server may access using for example, the commands and protocols discussed below with respect to FIG. 7.

Figure 1B:
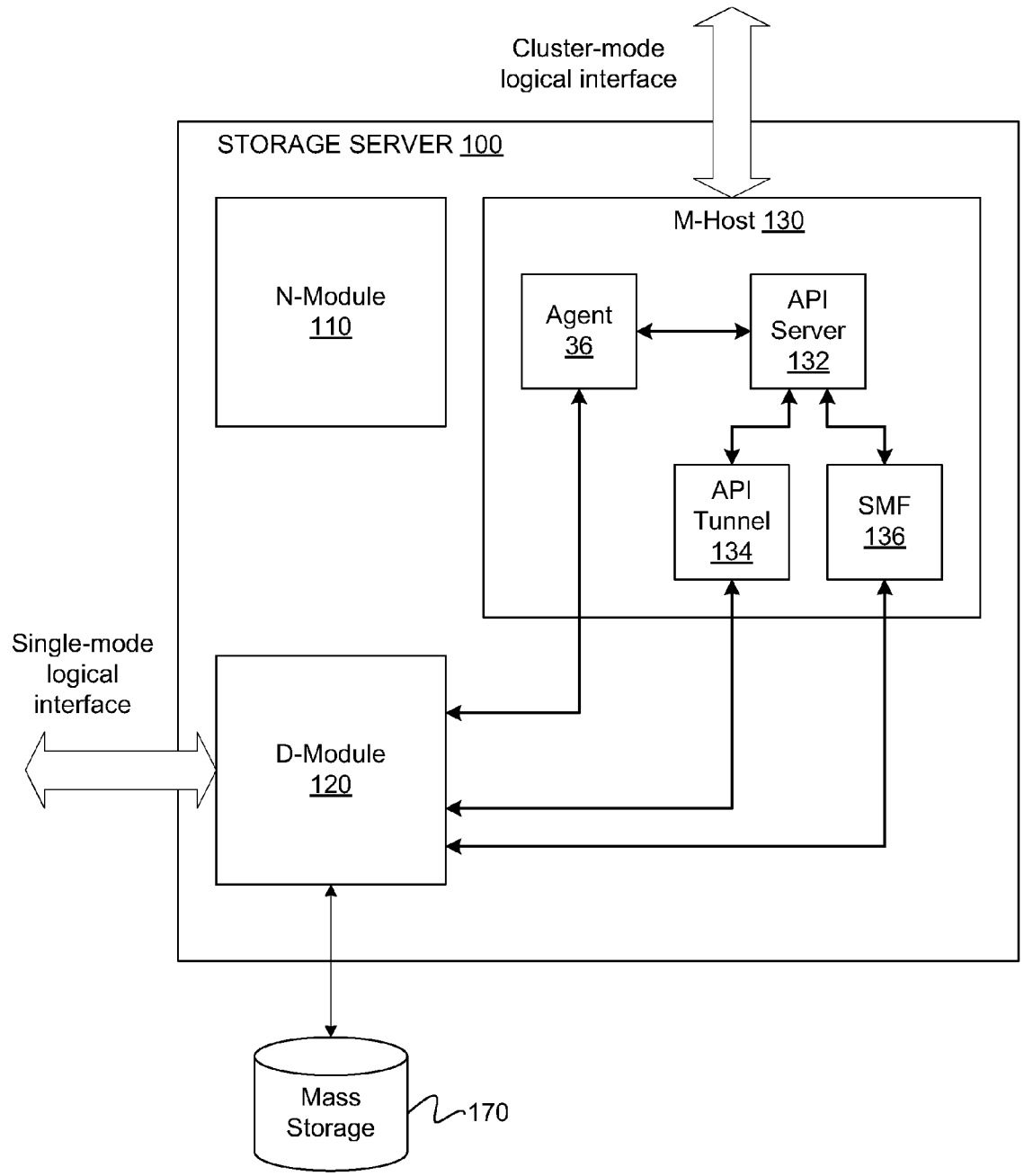
FIG. 1B is a block diagram illustrating a storage server according to an embodiment.

FIG. 1B is a block diagram illustrating a storage server 100 according to an embodiment of the present invention. In this embodiment storage server 100 includes a network module (N-module) 110, a disk module (D-module) 120, and a management module (M-host) 130. Storage server 100 is configured to receive and process data access requests from one or more client devices, such as client 101. In this embodiment, storage server 100 is configured to operate as a single storage server (i.e., "single mode") or as part of a cluster (i.e., "cluster mode"), as shown in FIG. 5B. As will be described further below, single mode requests are received at a logical interface in the D-module 120 and cluster mode requests are received at a logical interface in the M-host 130.

The logical interfaces at each of D-module 120 and M-host 130 have a separate Internet Protocol (IP) address, which may be known to the clients in the storage system. The clients may be configured (e.g., through user-configurable or default settings) to send data access requests to one of the IP addresses, depending on whether the request is a single mode request or a cluster mode request.

Figure 6:
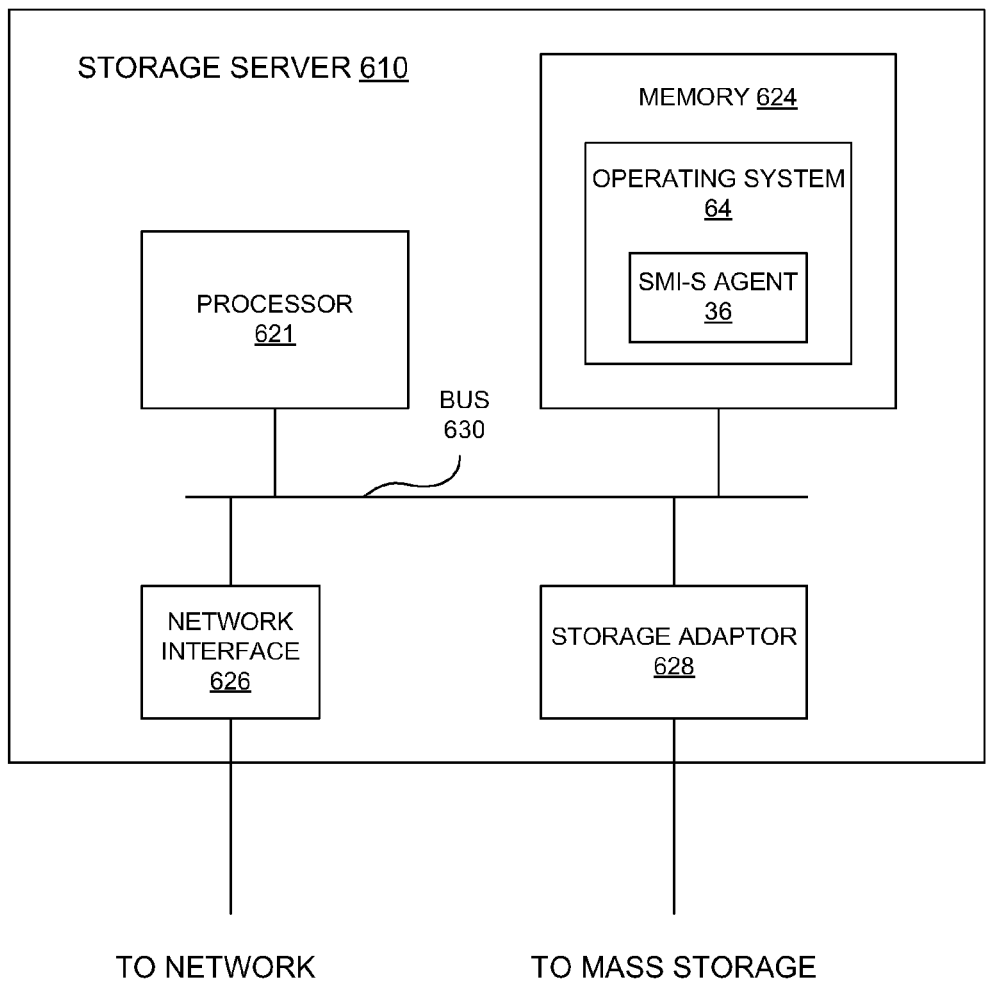
FIG. 6 is a block diagram illustrating a hardware architecture of a storage system according to an embodiment.
Figure 7:
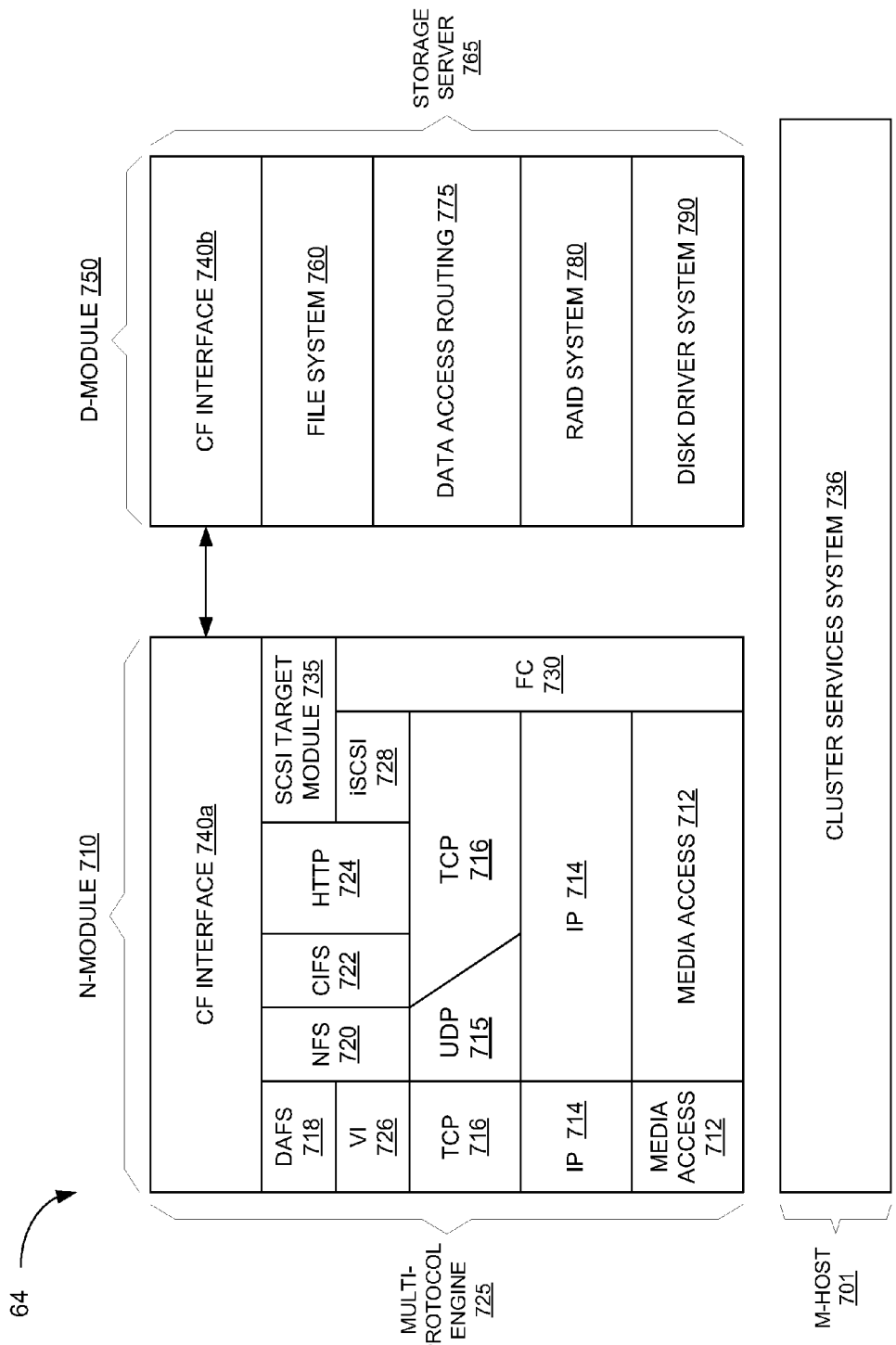
FIG. 7 is a block diagram illustrating the architecture of the operating system of the storage system according to an embodiment.

A single mode request received at D-module 120 is routed, for example by data access routing module 775 as shown in FIG. 7, to communication agent 36 running in M-host 130. In one embodiment communication agent 36 is an SMI-S agent run by a processor such as processor 621 as shown in FIG. 6, which translates standard SMI-S commands into a proprietary format used by the storage server to access data in mass storage device 170. Additional details of communication agent 36 will be described below with respect to FIG. 2. A cluster mode request received at M-host 130 is passed directly from the logical interface to communication agent 36.

Communication agent 36 makes an application programming interface (API) call through API server 132. API server 132 may include a known set of APIs corresponding to the SMI-S standard. For a single-mode request communication agent 36 calls an interface module 134. In one embodiment, interface module 134 is a single mode API tunnel module configured to form an API tunnel between M-Host 130 and D-Module 120. Interface module 134, in turn, makes an API call back to D-module 120. Using the modules described below with respect to FIG. 7, such as for example RAID system 780 and disk driver system 790, D-module 120 may service the request (e.g., read data or write data) to mass storage device 170. For a cluster mode request, communication agent 36 calls simple management framework (SMF) module 136. SMF module 136 may include tables and schema to store information pertaining to the APIs including API names, API parameters and API values. SMF module 136 makes an API call to D-module 120 of storage server 100, as well as the corresponding D-modules in each of the other storage servers in the cluster, as shown in FIG. 1A.

Figure 2:
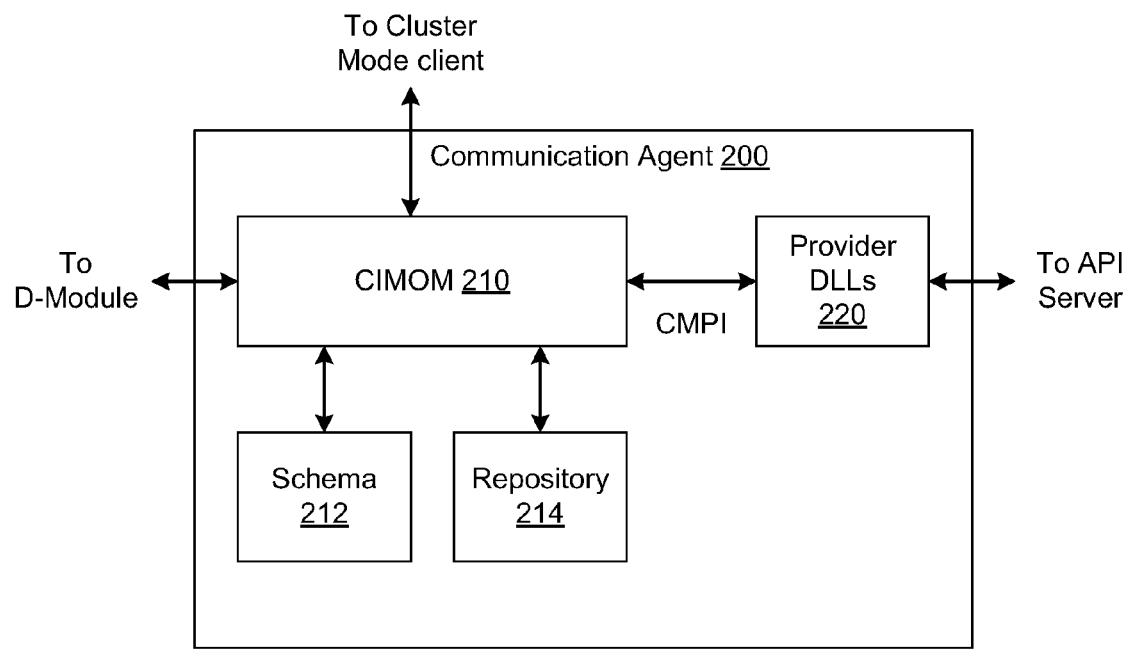
FIG. 2 is a block diagram illustrating a communication agent according to an embodiment.

FIG. 2 is a block diagram illustrating a communication agent according to an embodiment. In one embodiment, communication agent 200 is an SMI-S agent run on a processing device. SMI-S agent 200 may run in the M-host of a processing system as shown in FIG. 1B. SMI-S agent 200 translates standard SMI-S commands into a proprietary format used by the storage server to access data in the attached mass storage devices.

In one embodiment, SMI-S agent 200 includes Common Information Model Object Manager (CIMOM) 210. CIMOM 210 receives data access requests in single mode, routed through the D-module and directly from the logical interface of the M-host in cluster mode. The Common Information Model (CIM) is a standard that defines how elements in a storage system are represented as a common set of objects and the relationships between them. CIMOM 210 accesses schema 212 to define the specific set of objects (e.g., disks, clients, networks, etc.) managed by the storage server as well as the relationships between them. Repository 214 is a compilation of the data in schema 212. CIMOM 210 determines the information in the request based on the contents of schema 212 and repository 214. For example, CIMOM 210 may determine what client the data access request was received from, what the type of the data access request is (e.g., read or write), and what data in the storage system the data access request pertains to. This information is passed to the provider dynamic link library (DLL) 220 which uses application specific APIs from the API server 132 to complete the data access request.

In one embodiment, SMI-S agent 200 identifies whether a received data request is a single mode request or a cluster mode request. The type of data access request can be determined based on the interface at which it is received. Single mode data access requests are received at a logic interface in D-module 120 and forwarded to the agent 200 in M-Host 130. Cluster mode data access requests are received at a logical interface directly in M-Host 130. Each of the logical interfaces may have a unique IP address so that they can be distinguished by storage clients, such as client 101. As discussed above, CIMOM 210 may parse the received message to determine which logical interface it was received at, and thus, whether the request is single mode or cluster mode.

Once the type of data access request is determined, provider DLLs 220 selects the appropriate API from API server 132 to complete the data access request. The request may include an identifier specifying a known action (e.g., read or write) as well as one or more input parameters specifying a particular piece of data in mass storage 170. Provider DLLs 220 may include a list of APIs in API server 132, and may select one or more of the APIs based on information in the data access request. API server 132, may include separate APIs for single mode request and for cluster mode requests. As discussed above, the APIs for single mode requests may be executed through API tunnel 134 while APIs for cluster mode requests may be executed through SMF 136.

Figure 3:
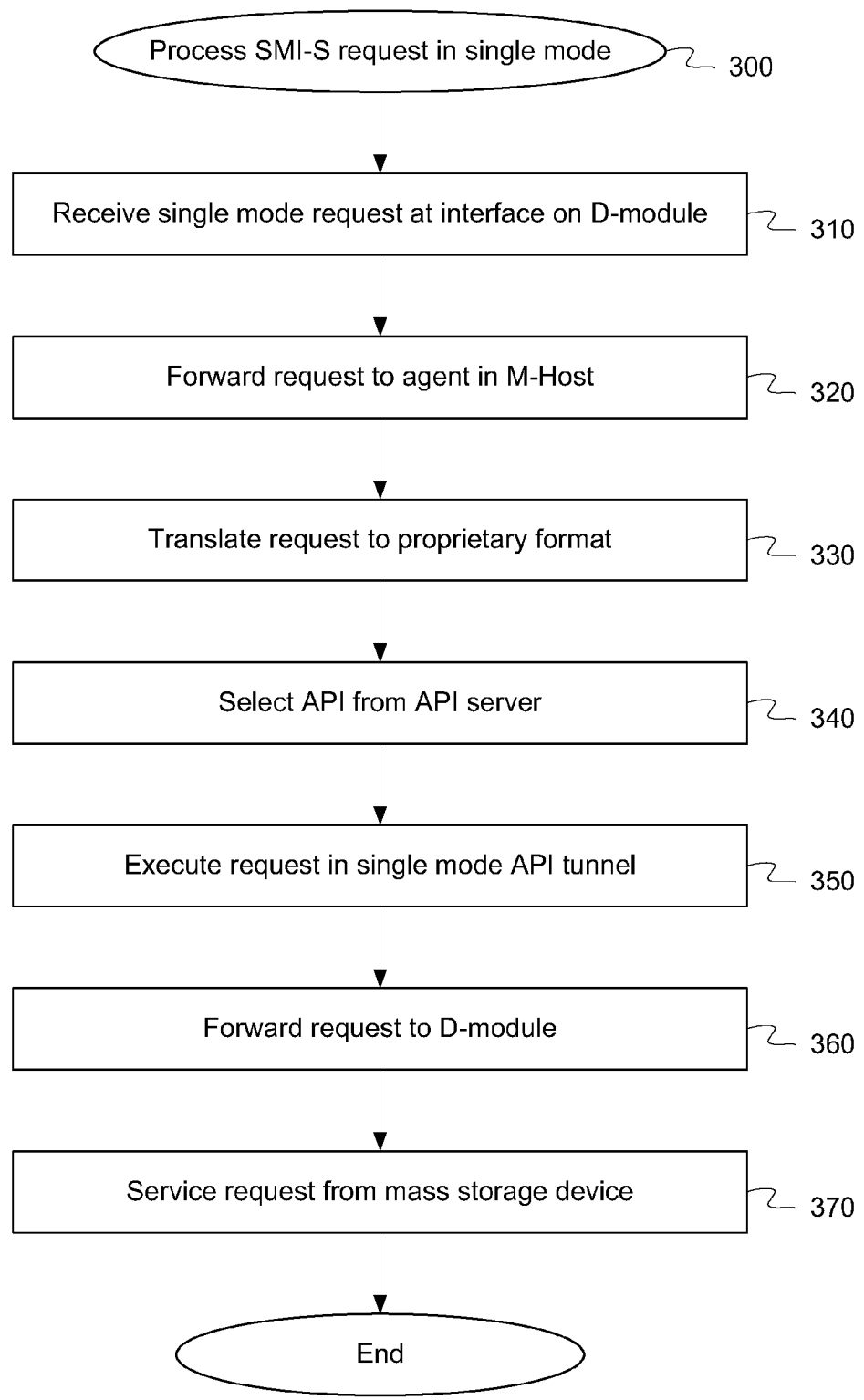
FIG. 3 is a flow chart illustrating a method for processing a single mode SMI-S data access request according to an embodiment.

FIG. 3 is a flow chart illustrating a method for processing a single mode SMI-S data access request according to an embodiment. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 300 is performed by storage server 100 of FIG. 1B.

At block 310, method 300 receives a single mode data access request at the logical interface of D-module 120. The request may be in the SMI-S format and may include for example, a request to read from or write to a data block in a storage device managed by the storage server. At block 320, method 300 forwards the data access request to an SMI-S agent in M-host 130. In one embodiment, a data access routing module 775 in D-module 120 routes the request to the SMI-S agent, such as SMI-S agent 36. At block 330, SMI-S agent 36 translates the request from the SMI-S standard into the proprietary format used by the storage server 100. The translation is described above with respect to FIG. 2 and may include identifying data in the request such as an action to be performed and data on which the action may be performed.

At block 340, method 300 selects the appropriate APIs for servicing the single mode data access request from API server 132. The appropriate APIs may be selected by determining whether the request is a single mode access request or a cluster mode access request. Provider DLLs 220 may select APIs from API server 132, based on the type of request and the data identified in the translation at block 330. At block 350, method 300 makes the API call through the single mode API tunnel. In one embodiment, API tunnel 134 encodes the APIs from API server 132 in an extensible markup language (XML) format for communication between M-Host 130 and D-module 120. At block 360, through the API call, method 300 forwards the request to D-module 120. Using the modules described below, such as for example RAID system 780 and disk driver system 790, at block 370, method 300 services the request (e.g., read data or write data) to the attached mass storage device. In the case of a read request, data is returned from the storage device to the D-module 120, forwarded to the M-host where it is translated to the SMI-S format by SMI-S agent 36, and routed back to the requesting client through D-module 120.

Figure 4:
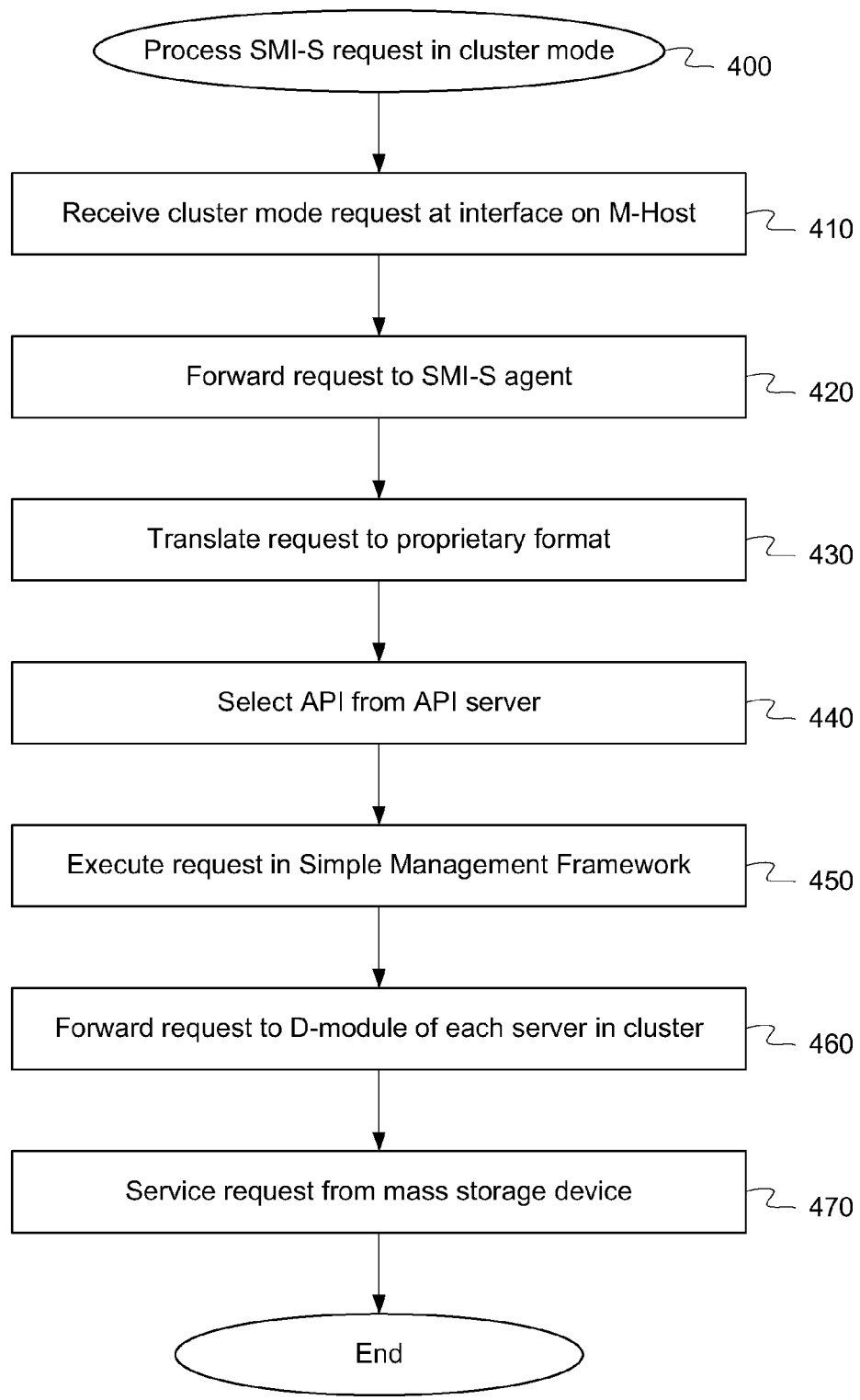
FIG. 4 is a flow chart illustrating a method for processing a cluster mode SMI-S data access request according to an embodiment.

FIG. 4 is a flow chart illustrating a method for processing a cluster mode SMI-S data access request according to an embodiment. The method 400 may be performed by processing logic that comprises hardware (e.g., circuitry, dedicated logic, programmable logic, microcode, etc.), software (e.g., instructions run on a processing device to perform hardware simulation), or a combination thereof. In one embodiment, method 400 is performed by storage server 100 of FIG. 1B.

At block 410, method 400 receives a cluster mode data access request at the logical interface of M-host 130. The request may be in the SMI-S format and may include for example, a request to read from or write to a data block in a storage device managed by the storage server. At block 420, method 400 forwards the data access request to an SMI-S agent, such as SMI-S agent 36, in M-host 130. At block 430, SMI-S agent 36 translates the request from the SMI-S standard into the proprietary format used by the storage server 100. The translation is described above with respect to FIG. 2.

At block 440, method 400 selects the appropriate APIs for servicing the cluster mode data access request from API server 132. The appropriate APIs may be selected by determining whether the request is a single mode access request or a cluster mode access request. Provider DLLs 220 may select APIs from API server 132, based on the type of request and the data identified in the translation at block 330. At block 450, method 400 makes the API call through the Simple Management Framework 136. In one embodiment, SMF 136 encodes the APIs from API server 132 in an extensible markup language (XML) format for communication between M-Host 130 and D-module 120. At block 460, through the API call, method 400 forwards the request to D-module 120 as well as the D-module of each storage server in the cluster. Using the modules described below, such as for example RAID system 780 and disk driver system 790, at block 470, method 400 services the request (e.g., read data or write data) to the attached mass storage device. In the case of a read request, data is returned from the storage device to the D-module 120, forwarded to the M-host where it is translated to the SMI-S format by SMI-S agent 36, and routed back to the requesting client through D-module 120.

Figure 5A:
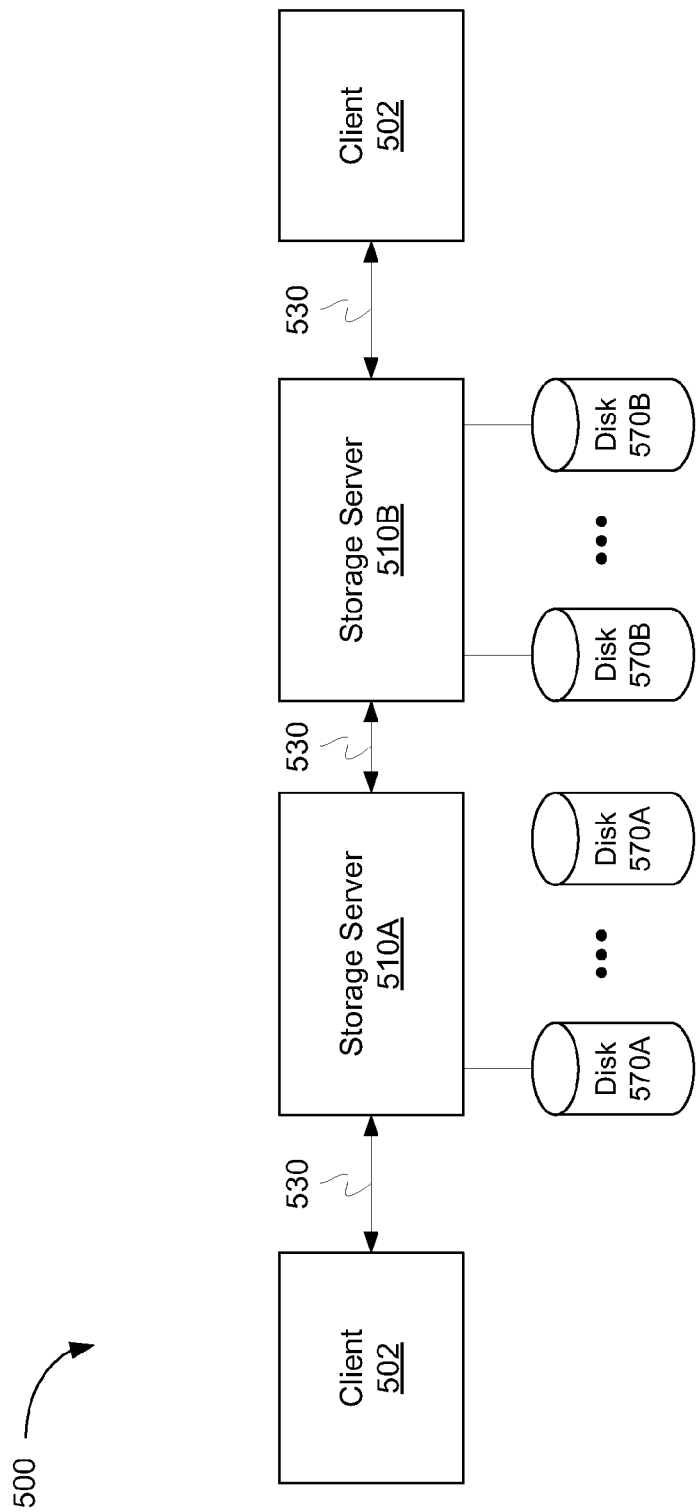
FIG. 5A is a block diagram illustrating a network storage system according to an embodiment.
Figure 5B:
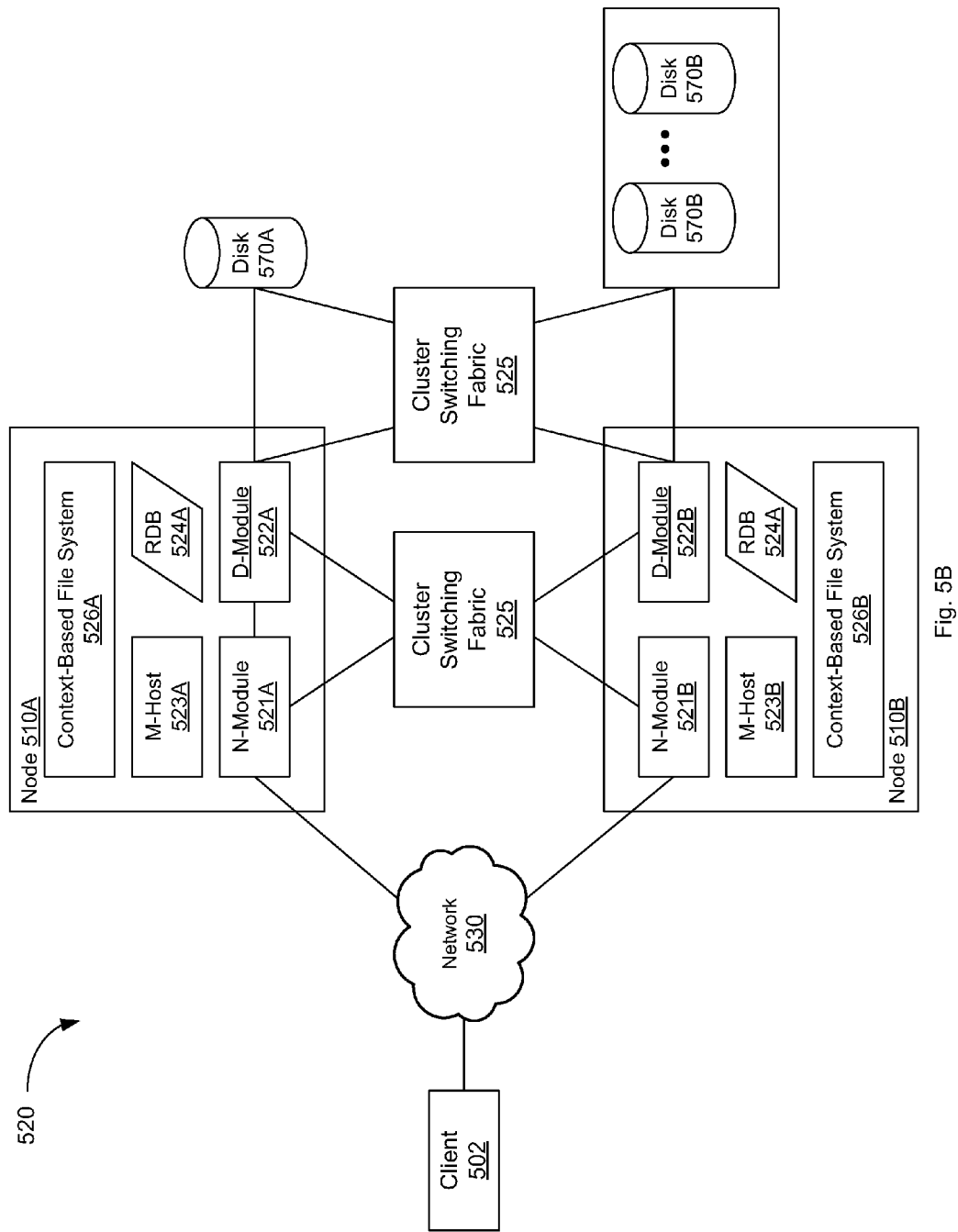
FIG. 5B is a block diagram illustrating a distributed or clustered architecture for a network storage system according to an embodiment.

FIG. 5A shows a network storage system 500 in which the present invention can be implemented in one embodiment. Storage servers 510A, 510B each manage multiple storage units 570A, 570B that may include mass storage devices. These storage servers provide data storage services to one or more clients 502 through a network 530. Network 530 may be, for example, a local area network (LAN), wide area network (WAN), metropolitan area network (MAN), a global area network such as the Internet, a Fibre Channel fabric, or any combination of such interconnects. Each of clients 502 may be, for example, a conventional personal computer (PC), server-class computer, workstation, handheld computing or communication device, or other special or general purpose computer.

Storage of data in storage units 570A, 570B is managed by storage servers 510A, 510B which receive and respond to various read and write requests from clients 502, directed to data stored in or to be stored in storage units 570A, 570B. Storage units 570A, 570B may constitute mass storage devices which can include, for example, flash memory, magnetic or optical disks, or tape drives. The storage devices in storage units 570A, 570B can further be organized into arrays (not shown in this figure) implementing a Redundant Array of Inexpensive Disks/Devices (RAID) scheme, whereby storage servers 510A, 510B access storage units 570A, 570B using one or more RAID protocols known in the art.

Storage servers 510A, 510B can provide file-level service such as used in a network-attached storage (NAS) environment, block-level service such as used in a storage area network (SAN) environment, a service which is capable of providing both file-level and block-level service, or any other service capable of providing other data access services. Although storage servers 510A, 510B are each illustrated as single units in FIG. 5A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 5B.

In yet other embodiments, storage servers 510A, 510B are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, mirroring, etc., provided, for example, on archive, backup, or secondary storage server connected to a primary storage server. A network storage subsystem can also be implemented with a collection of networked resources provided across multiple storage servers and/or storage units Illustratively, one of the storage servers (e.g., storage server 510A) functions as a primary provider of data storage services to client 502. Data storage requests from client 502 are serviced using disks 570A organized as one or more storage objects. A secondary storage server (e.g., storage server 510B) takes a standby role in a protection relationship with the primary storage server, replicating storage objects from the primary storage server to storage objects organized on disks of the secondary storage server (e.g., disks 570B). In operation, the secondary storage server does not service requests from client 502 until data in the primary storage object becomes inaccessible such as in a disaster with the primary storage server, such event considered a failure at the primary storage server. Upon a failure at the primary storage server, requests from client 101 intended for the primary storage object are serviced using replicated data (i.e. the secondary storage object) at the secondary storage server.

It will be appreciated that in other embodiments, network storage system 100 may include more than two storage servers. In these cases, protection relationships may be operative between various storage servers in system 500 such that one or more primary storage objects from storage server 510A may be replicated to a storage server other than storage server 510B (not shown in this figure). Secondary storage objects may further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 510 should be taken as illustrative only.

FIG. 5B illustrates a distributed or clustered network storage system 520 which may implement the principles of the present invention in one embodiment. System 520 may include storage servers implemented as nodes 510A, 510B, which are each configured to provide access to storage devices 570A, 570B. In the illustrative example, nodes 510A, 510B are interconnected by a cluster switching fabric 525 which may be embodied as an Ethernet switch in one embodiment.

Nodes 510A, 510B may be operative as multiple functional components that cooperate to provide a distributed architecture of system 520. To that end, each node 510A, 510B may be organized as a network element or module (N-module 521A, 521B), a disk element or module (D-module 522A, 522B), and a management element or module (M-host 523A, 523B). In one embodiment, each module includes a processor and memory for carrying out respective module operations. For example, N-module 521A, 521B may include functionality that enables node 510A, 510B to connect to client 502 via network 530 and may include protocol components such as a media access layer, Internet Protocol (IP) layer, Transport Control Protocol (TCP) layer, User Datagram Protocol (UDP) layer, and other protocols known in the art.

In contrast, D-module 522A, 522B may connect to one or more storage devices 570A, 570B via cluster switching fabric 525 and may be operative to service access requests on devices 570A, 570B. In one embodiment, the D-module 522A, 522B includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. Illustratively, a storage abstraction layer (e.g., file system) of the D-module divides the physical storage of devices 570A, 570B into storage objects. Requests received by node 510A, 510B (e.g., via N-module 521A, 521B) may thus include storage object identifiers to indicate a storage object on which to carry out the request.

Also operative in node 510A, 510B is M-host 523A, 523B which provides cluster services for node 510A, 510B by performing operations in support of a distributed storage system image, for instance, across system 520. Illustratively, M-host 523A, 523B provides cluster services by managing a data structure such as a RDB 524A, 524B, which contains information used by N-module 521A, 521B to determine which D-module 522A, 522B "owns" (services) each storage object. The various instances of RDB 524A, 524B across respective nodes 510A, 510B may be updated regularly by M-host 523A, 523B using conventional protocols operative between each of the M-hosts (e.g., across network 530) to bring them into synchronization with each other. A client request received by N-module 521A, 521B may then be routed to the appropriate D-module 522A, 522B for servicing to provide a distributed storage system image.

It should be noted that while FIG. 5B shows an equal number of N-modules and D-modules constituting a node in the illustrative system, there may be different number of N-modules and D-modules constituting a node in accordance with various embodiments of the present invention. For example, there may be a number of N-modules and D-modules of node 510A that does not reflect a one-to-one correspondence between the N-modules and D-modules of node 510B. As such, the description of a node comprising one N-module and one D-module for each node should be taken as illustrative only.

FIG. 6 illustrates a schematic block diagram of one embodiment of a storage system 610 which may implement the above-described schemes, according to certain embodiments of the invention. Referring to FIG. 6, in this embodiment, the storage system 610 includes a processor 621, a memory 624, a network interface 626, and a storage adaptor 628, which are coupled to each other via a bus system 630. The bus system 630 may include one or more busses and/or interconnects. The storage system 610 communicates with a network via the network interface 626, which may be an Ethernet adaptor, fiber channel adaptor, etc. The network interface 626 may be coupled to a public network, a private network, or a combination of both in order to communicate with a client machine usable by an administrator of the remote data storage system.

In one embodiment, the processor 621 reads instructions from the memory 624 and executes the instructions. The memory 624 may include any of various types of memory devices, such as, for example, random access memory (RAM), read-only memory (ROM), flash memory, one or more mass storage devices (e.g., disks), etc. The memory 624 stores instructions of an operating system 64. The processor 621 retrieves the instructions from the memory 624 to run the operating system 64. In one embodiment operating system 64 includes SMI-S agent 36, which will be described further below. The storage system 610 may interface with one or more storage systems via the storage adaptor 628, which may include a small computer system interface (SCSI) adaptor, fiber channel adaptor, etc.

FIG. 7 shows a storage operating system 64 of storage system 610 according to an embodiment of the present invention. The storage operating system comprises a series of software layers executed by a processor (e.g., processor 621) and organized to form an integrated network protocol stack or, more generally, a multi-protocol engine 725 that provides data paths for clients to access information stored on the storage server using block and file access protocols.

Multi-protocol engine 725 includes a media access layer 712 of network drivers (e.g., gigabit Ethernet drivers) that interface with network protocol layers, such as the IP layer 714 and its supporting transport mechanisms, the TCP layer 716 and the User Datagram Protocol (UDP) layer 715. A file system protocol layer provides multi-protocol file access and, to that end, includes support for the Direct Access File System (DAFS) protocol 718, the NFS protocol 720, the CIFS protocol 722 and the Hypertext Transfer Protocol (HTTP) protocol 724. A VI layer 726 implements the VI architecture to provide direct access transport (DAT) capabilities, such as RDMA, as required by the DAFS protocol 718. An iSCSI driver layer 728 provides block protocol access over the TCP/IP network protocol layers, while a FC driver layer 730 receives and transmits block access requests and responses to and from the storage server. In certain cases, a Fibre Channel over Ethernet (FCoE) layer (not shown) may also be operative in multi-protocol engine 725 to receive and transmit requests and responses to and from the storage server. The FC and iSCSI drivers provide respective FC- and iSCSI-specific access control to the blocks and, thus, manage exports of luns to either iSCSI or FCP or, alternatively, to both iSCSI and FCP when accessing blocks on the storage server.

The storage operating system also includes a series of software layers organized to form a storage server 765 that provides data paths for accessing information stored on storage devices implementing secure storage (e.g., storage devices 570A, 570B). Information may include data received from a client (e.g., client 502), in addition to data accessed by the storage operating system in support of storage server operations such as program application data or other system data. Preferably, client data may be organized as one or more logical storage objects (e.g., volumes) that comprise a collection of storage devices cooperating to define an overall logical arrangement. In one embodiment, the logical arrangement may involve logical volume block number (vbn) spaces, wherein each volume is associated with a unique vbn.

File system 760 implements a virtualization system of the storage operating system through the interaction with one or more virtualization modules illustratively embodied as, e.g., a SCSI target module 735. SCSI target module 735 is generally disposed between drivers 728, 730 and file system 760 to provide a translation layer between the block (lun) space and the file system space, where luns are represented as blocks. File system 760 illustratively implements the WAFL file system having an on-disk format representation that is block-based using, e.g., 4 kilobyte (KB) blocks and using a data structure such as index nodes ("inodes") to identify files and file attributes (such as creation time, access permissions, size and block location). File system 760 uses files to store metadata describing the layout of its file system, including an inode file, which directly or indirectly references (points to) the underlying data blocks of a file.

Operationally, a request from a client is forwarded as a packet over the network and onto the storage server where it is received at a network adapter (e.g., adapter 626). A network driver such as layer 712 or layer 730 processes the packet and, if appropriate, passes it on to a network protocol and file access layer for additional processing prior to forwarding to file system 760. There, file system 760 generates operations to load (or retrieve) the requested data from the disks if it is not resident "in core", i.e., in memory 624. If the information is not in memory, file system 760 accesses the inode file to retrieve a logical vbn and passes a message structure including the logical vbn to the RAID system 780. There, the logical vbn is mapped to a disk identifier and device block number (e.g., disk, dbn) and sent to an appropriate driver (e.g., SCSI) of disk driver system 790. The disk driver accesses the dbn from the specified disk and loads the requested data block(s) in memory 624 for processing by the storage server. Upon completion of the request, the node (and operating system 64) returns a reply to the client over the network. In one embodiment, where the request is a single mode SMI-S request, the request is received directly at D-module 750. Data access routing module 775 detects the request and routes the request to an SMI-S agent in M-host 701 for processing, as described with respect to FIG. 1B.

It should be noted that the software "path" through the storage operating system layers described above needed to perform data storage access for the client request received at the storage server adaptable to the teachings of the invention may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by the storage server in response to a request issued by a client. Moreover, in another alternate embodiment of the invention, the processing elements of adapters 626, 628 may be configured to offload some or all of the packet processing and storage access operations, respectively, from processor 621, to thereby increase the performance of the storage service provided by the storage server. It is expressly contemplated that the various processes, architectures and procedures described herein can be implemented in hardware, firmware or software.

When implemented in a cluster, data access components of the storage operating system may be embodied as D-module 750 for accessing data stored on disk. In contrast, multi-protocol engine 725 may be embodied as N-module 710 to perform protocol termination with respect to a client issuing incoming access over the network, as well as to redirect the access requests to any other N-module in the cluster. A cluster services system 736 may further implement an M-host (e.g., M-host 701) to provide cluster services for generating information sharing operations to present a distributed file system image for the cluster. For instance, media access layer 712 may send and receive information packets between the various cluster services systems of the nodes to synchronize the replicated databases in each of the nodes.

In addition, a cluster fabric (CF) interface module 740a, 740b may facilitate intra-cluster communication between N-module 710 and D-module 750. For instance, D-module 750 may expose a CF application programming interface (API) to which N-module 710 (or another D-module not shown) issues calls. To that end, CF interface module 740 can be organized as a CF encoder/decoder using local procedure calls (LPCs) and remote procedure calls (RPCs) to communicate a file system command to between D-modules residing on the same node and remote nodes, respectively.

Illustratively, the storage operating system issues a read- or write-command to a storage device controller (e.g., device controller 628) through disk driver system 790 for accessing a physical storage object (e.g., disk) using the disk identifier mapped from the logical vbn by RAID system 780.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including conventional write in place file systems.

The above description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of the present invention include various operations, which are described above. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

The digital processing devices described herein may include one or more general-purpose processing devices such as a microprocessor or central processing unit, a controller, or the like. Alternatively, the digital processing device may include one or more special-purpose processing devices such as a digital signal processor (DSP), an application specific integrated circuit (ASIC), a field programmable gate array (FPGA), or the like. In an alternative embodiment, for example, the digital processing device may be a network processor having multiple processors including a core unit and multiple microengines. Additionally, the digital processing device may include any combination of general-purpose processing devices and special-purpose processing device(s).

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the above descriptions, embodiments have been described in terms of objects in an object-oriented environment. It should be understood, that the invention is not limited to embodiments in object-oriented environments and that alternative embodiments may be implemented in other programming environments having characteristics similar to object-oriented concepts.

In the foregoing specification, the invention has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method in a storage server in a cluster of storage servers, wherein each storage server in the cluster of storage servers is coupled to a set of one or more mass storage devices, the method comprising:
   receiving, by the storage server, a data access request from a client device in a standard communication format;
   if the data access request is received at a first logical interface of a plurality of logical interfaces of the storage server,
      determining, based upon receipt of the data access request at the first logical interface, that a type of the data access request is a cluster mode request, wherein cluster mode requests seek data from the cluster of storage servers, wherein the first logical interface is addressed by a first network address and is associated with a management module that handles cluster mode requests received by the storage server;
      selecting a set of one or more Application Programming Interfaces (APIs) from a plurality of APIs utilized by the cluster of storage servers, wherein each API of the plurality of APIs describes a protocol for processing data access requests;
      translating, using the selected set of APIs, the data access request from the standard communication format to a set of one or more proprietary format requests used by the storage server to communicate with the cluster of storage servers; and servicing the data access request by using a mass storage device of the storage server and by forwarding the translated set of proprietary format requests to a plurality of storage servers of the cluster of storage servers;

if the data access request is received at a second logical interface of the plurality of logical interfaces of the storage server, determining that the type of the second data access request is a single mode request, based upon receipt of the second data access request at the second logical interface, wherein single mode requests seek data from the storage server, wherein the second logical interface is addressed by a second network address and is associated with a disk module that handles single mode requests received by the storage server; and selecting an API corresponding to the type of the second data access request from the plurality of APIs.

2. The method of claim 1, wherein the standard communication format is a Storage Management Initiative-Specification (SMI-S) format.

3. The method of claim 1, further comprising:
executing the corresponding API by a single mode API tunnel module in the storage server.

4. The method of claim 1, further comprising:
receiving, from the plurality of storage servers and the mass storage device, data satisfying the translated set of proprietary format requests.

5. The method of claim 4, further comprising:
translating the data satisfying the translated request into a translated response in the standard communication format; and transmitting, to the client device, the translated response.

6. The method of claim 1, wherein the first network address comprises a first Internet Protocol (IP) address.

7. The method of claim 1, wherein the second network address comprises a second Internet Protocol (IP) address.

8. A system, comprising:
an array of mass storage devices; and
a storage server coupled to the array of mass storage devices and also coupled to a set of one or more other storage servers to form a cluster of storage servers, the storage server comprising:
a set of one or more network interfaces;
a disk module associated with a first of a plurality of logical interfaces and configured to service data access requests received via the first logical interface using the array of mass storage devices, wherein the first logical interface is designated for single mode requests and is addressed by a first network address, wherein single mode data access requests seek data from the storage server; and
a management module associated with a second logical interface of the plurality of logical interfaces designated for cluster mode requests and is addressed by a second network address, the management module configured to:
determine, based upon receipt of a data access request via the second logical interface of the plurality of logical interfaces, that the data access request is a cluster mode request, wherein cluster mode requests seek data from the cluster of storage servers;

select, for the cluster mode data access request, a set of one or more Application Programming Interfaces (APIs) from a plurality of APIs utilized by the cluster of storage servers, and wherein each API of the plurality of APIs describes a protocol for processing data access requests, translate the cluster mode data access request using the selected set of APIs, wherein the cluster mode data access request is translated from a standard communication format to a set of one or more proprietary format requests used by the storage server to communicate with the cluster of storage servers, and service the cluster mode data access request by forwarding, using the set of network interfaces, the translated sets of proprietary format requests to a plurality of storage servers in the cluster of storage servers.

9. The system of claim 8, wherein the standard communication format is a Storage Management Initiative-Specification (SMI-S) format.

10. The system of claim 8, further comprising:
a single mode API tunnel module configured to execute the corresponding API in the storage server.

11. The system of claim 8, wherein the management module further:
receives, from the plurality of storage servers and the disk module, data satisfying the translated sets of proprietary format requests.

12. The system of claim 11, wherein:
the management module further translates the data satisfying the translated sets of proprietary format requests into translated responses that are in the standard communication format; and transmits, to the set of client devices, the translated responses via the first logical interface if the data access request was a single mode request and via the second logical interface if the data access request was a cluster mode request.

13. The system of claim 8, wherein the first network address comprises a first Internet Protocol (IP) address.

14. The system of claim 8, wherein the second network address comprises a second Internet Protocol (IP) address.

15. A storage server configured to operate as part of a cluster of storage servers, the storage server comprising:
a processor unit; and
a memory, coupled to the processor unit, storing instructions which, when executed by the processor unit, cause the storage server to:
receive a data access request in a standard communication format from a client device;
if the data access request is received at a first logical interface of a plurality of logical interfaces of the storage server,
determine, based upon receipt of the data access request at the first logical interface, that a type of the data access request is a cluster mode request, wherein cluster mode requests seek data from the cluster of storage servers, wherein the first logical interface is addressed by a first network address and is associated with a management module that handles cluster mode requests received by the storage server;
select a set of one or more Application Programming Interfaces (APIs) from a plurality of APIs utilized by the cluster of storage servers, wherein each API of the plurality of APIs describes a protocol for processing data access requests;

translate, using the set of selected APIs, the cluster mode data access request from the standard communication format to a set of one or more proprietary format requests used by the storage server to communicate with the cluster of storage servers; and service the cluster mode data access request by using a mass storage device coupled to the storage server and by forwarding the translated set of proprietary format requests to a plurality of storage servers of the cluster of storage servers if the data access request is received at a second logical interface of the plurality of logical interfaces of the storage server, determine that the type of the second data access request is a single mode request, based upon receipt of the second data access request at the second logical interface, wherein single mode requests seek data from the storage server, wherein the second logical interface is addressed by a second network address and is associated with a disk module that handles single mode requests received by the storage server; and select an API corresponding to the type of the second data access request from the plurality of APIs.

16. The storage server of claim 15, wherein the standard communication format is a Storage Management Initiative-Specification (SMI-S) format.

17. The storage server of claim 15, wherein the instructions further cause the storage server to:

execute the corresponding API by a single mode API tunnel module in the storage server.

18. The storage server of claim 15, wherein the instructions further cause the storage server to:

receive, from the plurality of storage servers and the mass storage device, data satisfying the translated set of proprietary format requests.

19. The storage server of claim 18, wherein the instructions further cause the storage server to:

translate the data satisfying the translated set of proprietary format requests into a translated response in the standard communication format; and transmit, to the client device, the translated response.

20. The storage server of claim 15, wherein the first network address comprises a first Internet Protocol (IP) address.

21. The storage server of claim 15, wherein the second network address comprises a second Internet Protocol (IP) address.

* * * * *